United States Patent
Blank et al.

(10) Patent No.: US 6,427,894 B1
(45) Date of Patent: Aug. 6, 2002

(54) ELECTRODE WIRE FEEDER FOR AN ARC WELDING SYSTEM

(75) Inventors: Leon William Blank, Lenoir City, TN (US); David Charles Griffin; Dale Thomas Wiersema, both of Florence, SC (US)

(73) Assignee: The ESAB Group, Inc., Florence, SC (US)

(*) Notice: Subject to any disclaimer, the term of this patent is extended or adjusted under 35 U.S.C. 154(b) by 0 days.

(21) Appl. No.: 09/692,406

(22) Filed: Oct. 19, 2000

(51) Int. Cl.[7] .............................. B65H 20/00; G03B 1/56
(52) U.S. Cl. .................... 226/177; 226/90; 226/187; 226/188
(58) Field of Search ................. 226/176, 177, 226/180, 187, 188, 90; 219/137.2

(56) References Cited

U.S. PATENT DOCUMENTS

| | | |
|---|---|---|
| 1,738,573 A | 12/1929 | Goodspeed |
| 2,040,030 A | 5/1936 | Snyder et al. |
| 2,066,163 A | 12/1936 | Stephens et al. |
| 2,170,673 A | 8/1939 | Anderson |
| 2,196,647 A | 4/1940 | Snyder et al. |
| 2,271,723 A | 2/1942 | Trainer |
| 2,272,158 A | 2/1942 | Anderson |
| 2,606,267 A | 8/1952 | McElrath, Jr. |
| 2,719,245 A | 9/1955 | Anderson |
| 2,730,646 A | 1/1956 | Houldcroft et al. |
| 2,826,927 A | 3/1958 | Tiedemann |
| 2,904,168 A * | 9/1959 | Wall et al. ............... 223/176 |
| 2,906,913 A | 9/1959 | Catlett |
| 2,909,646 A | 10/1959 | Russell |
| 3,009,619 A | 11/1961 | Layden |
| 3,016,451 A | 1/1962 | Cornell, Jr. |
| 3,046,438 A | 7/1962 | Elseth |
| 3,207,401 A * | 9/1965 | Everett .................. 226/177 |
| 3,328,851 A * | 7/1967 | Whitehurst ............. 226/194 |
| 3,331,545 A * | 7/1967 | Olivieri ................. 226/187 |
| 3,344,305 A | 9/1967 | Ogden |
| 3,382,398 A | 5/1968 | Austin et al. |
| 3,387,759 A | 6/1968 | Stedman |
| 3,404,823 A * | 10/1968 | Thompson .............. 226/188 |
| 3,430,832 A * | 3/1969 | Meyer ................... 226/177 |
| 3,447,730 A * | 6/1969 | Jeannette ............... 226/176 |
| 3,693,858 A | 9/1972 | Araya et al. |
| 3,892,937 A | 7/1975 | Paton et al. |
| 3,898,419 A | 8/1975 | Smith |
| 3,901,425 A | 8/1975 | Taylor et al. |
| 5,816,466 A * | 10/1998 | Seufer .................. 226/187 |

FOREIGN PATENT DOCUMENTS

| | | |
|---|---|---|
| DE | 2064758 | 7/1972 |
| DE | 29915301 | 8/2000 |
| EP | 1016486 | 7/2000 |

* cited by examiner

Primary Examiner—Michael R. Mansen
(74) Attorney, Agent, or Firm—Alston & Bird LLP

(57) ABSTRACT

An electrode wire feeder, including a housing defining a sealed compartment for containing a suitable lubricant, respective pairs of feed rolls rotatably mounted exteriorly of said housing, on rotatable shafts, one of the shafts of each pair of feed rolls being mounted in eccentric mounting member rotatably mounted in one wall of the housing for moving one of the feed rolls of each pair between operative and inoperative positions, pinion gears mounted on the inner ends of the feed roll shafts inside the lubricant compartment with the pinion gears of the movable shafts moving into and out of meshing relation with the other pinion gears, a motor driven gear in the compartment and meshing with the pinion gears for driving the feed rolls, and manually operable levers for rotating the eccentric mounting members to move the feed rolls between operative and inoperative positions.

12 Claims, 2 Drawing Sheets

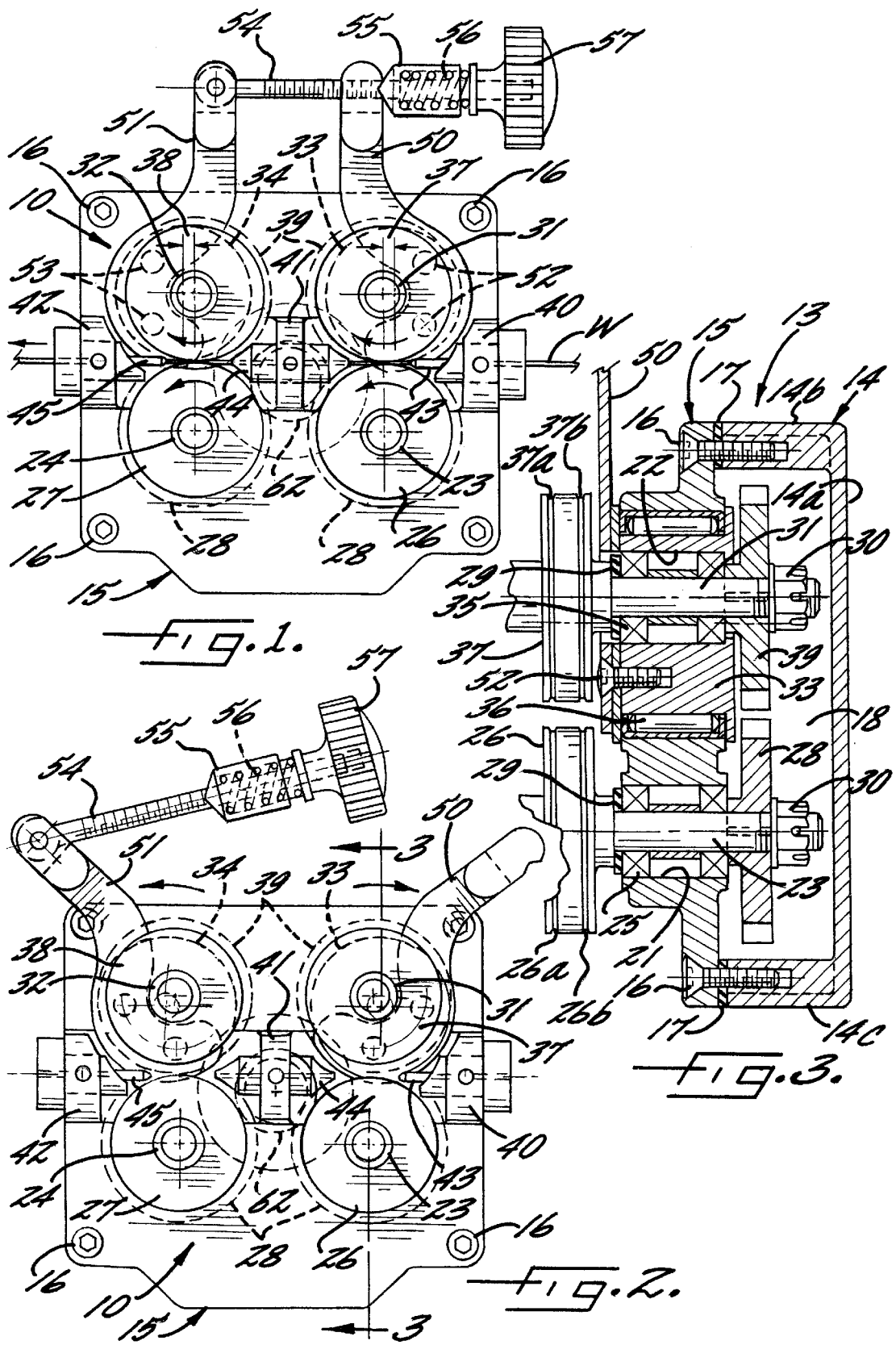

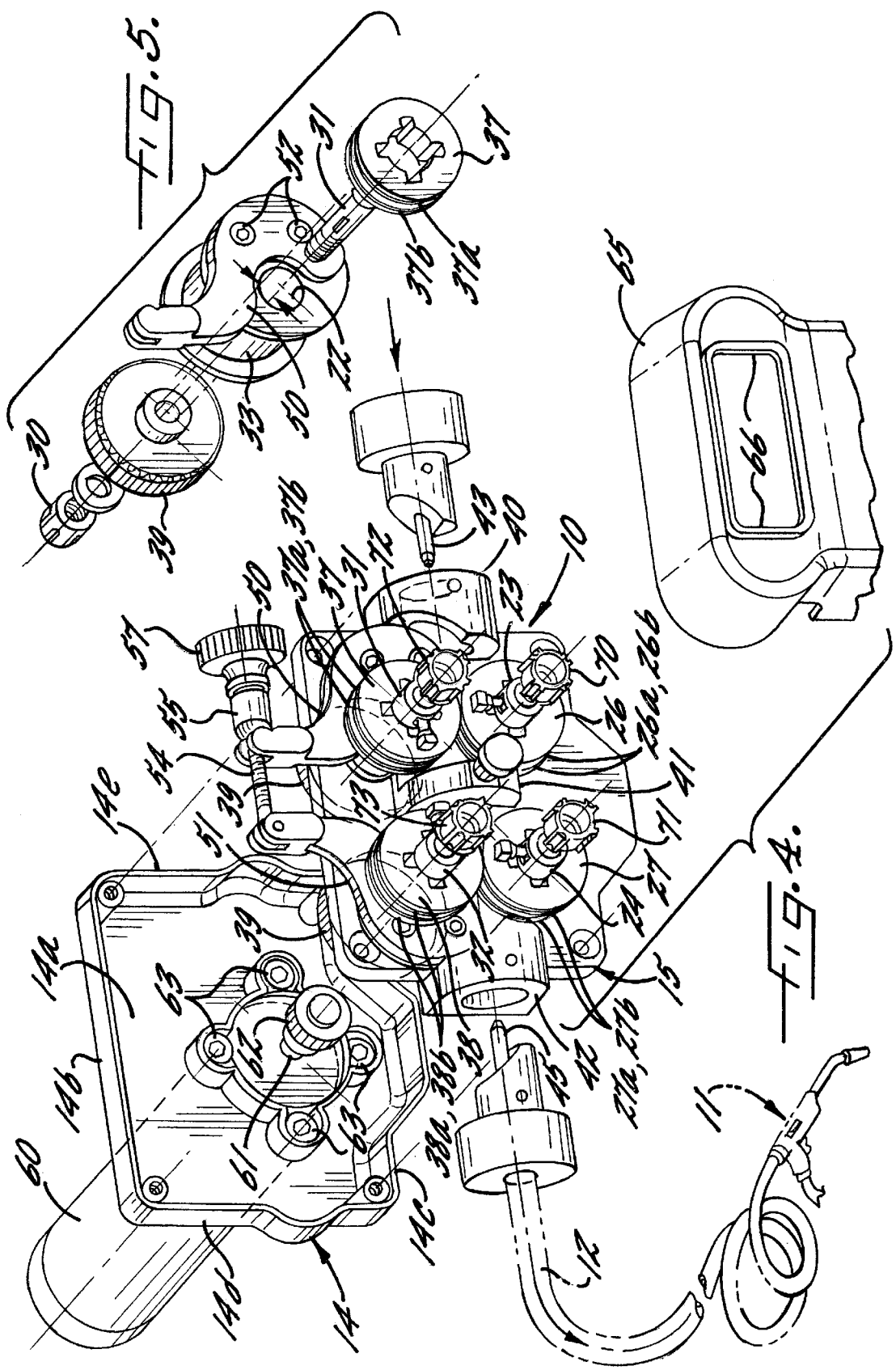

ELECTRODE WIRE FEEDER FOR AN ARC WELDING SYSTEM

FIELD OF THE INVENTION

The present invention relates to arc welding systems and more particularly to an electrode wire feeder therefor.

BACKGROUND OF THE INVENTION

Gas metal arc (Mig) welding has several advantages over other types of welding including high deposition rates, speed, excellent weld quality, minimal distortion of the work piece and no stub loss. Typically, conventional Mig apparatus includes a torch and a wire electrode continuously fed from a supply reel or other source by an electrode wire feeder through the torch. The arc between the torch and the work piece continuously melts the wire electrode to form the weld puddle.

Heretofore, electrode wire feeders have included opposed feed rolls which exert sufficient pressure on the electrode wire passing therebetween and are driven by meshing gears to feed the electrode wire to and through the torch. In some instances, a single pair of opposed feed rolls are used, while in other instances two pairs of feed rolls are utilized in spaced relation along the feed path of the wire.

Because the electrode wire has to be threaded between the opposed feed rolls, provision must be made to form a gap therebetween for threading-up purposes and for closure of such a gap for operational purposes. Typically, one of the feed rolls of the pair or each of the pairs of feed rolls is mounted for movement between operative and inoperative positions to provide for formation and closure of such a gap. One example of such a feed roll arrangement has the stationary feed roll positively driven while the movable roll is rotated by contact with the driven roll. Such an arrangement is less than desirable because of slippage and uneven feeding of the electrode wire.

Accordingly, most electrode wire feeders have both feed rolls driven by meshing pinion gears on the shafts of the feed rolls. Because of the necessity of moving the feed rolls apart, it has heretofore been considered necessary to have both the feed rolls and their pinion gears adjacent and therefore exposed. These exposed gears are difficult to lubricate and are impossible to lubricate properly. In addition, such exposed gears collect dirt, debris and other foreign matter, all of which causes the gears to wear excessively and unevenly. Lastly, these exposed gears present a potential safety hazard to the operator and possibly others. Consequently, there has been a need for an electrode wire feeder which has the gearing thereof confined in a compartment containing a suitable lubricant while still providing for movement of the feed rolls between operative and inoperative positions.

This need was recognized in U.S. Pat. No. 2,272,158 which disclosed two pairs of feed rolls driven by gears enclosed in a gear box filled with a high temperature grease. However, the feed rolls were carried by shafts having fixed axes and the feed rolls were described as being expandable and retractable to provide the requisite gaps therebetween. Such an arrangement is cumbersome and has many other disadvantages and deficiencies.

SUMMARY OF THE INVENTION

With the foregoing in mind, it is an object of the present invention to provide an electrode wire feeder in which wire feed rolls are driven by gearing that is safely housed in a compartment and lubricated by a suitable lubricant and in which the feed rolls are movable between operative and inoperative positions.

This object is accomplished in accordance with the present invention by providing a housing defining an enclosed compartment in which a suitable lubricant may be confined. At least one pair of feed rolls is mounted on the housing exteriorly of the compartment by shafts that extend into the compartment and are driven by gearing therein. At least one of the feed roll shafts is mounted for movement toward and away from the other feed roll shaft for moving the feed roll thereon between operative and inoperative positions. Preferably, there are two pairs of feed rolls, with all of the feed rolls being gear driven, and one roll of each pair being movable. Also, the movable feed rolls are biased toward the other feed rolls when in the operative position.

BRIEF DESCRIPTION OF THE DRAWINGS

Having thus described the invention in general terms, reference will now be made to the accompanying drawings, which are not necessarily drawn to scale, and wherein:

FIG. 1 is a front elevational view of the electrode wire feeder of the present invention showing the feed rolls in their operative position;

FIG. 2 is a view similar to FIG. 1 showing the electrode wire feeder with the feed rolls in the inoperative position;

FIG. 3 is a vertical sectional view taken substantially along line 3—3 in FIG. 2;

FIG. 4 is an exploded, fragmentary perspective view of the wire feeder shown in FIGS. 1–3; and FIG. 5 is an exploded perspective view of a movable feed roll, its shaft, an eccentric mounting member and the driving gear therefor.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now more particularly to the drawings and specifically to FIG. 1, there is illustrated an electrode wire feeder, generally indicated at 10, incorporating the features of the present invention. The electrode wire feeder 10 is primarily intended for use as a component of a gas metal arc ("Mig") welding apparatus which employs a very flexible metal joining process. In Mig welding, an arc is established between a work piece and a wire electrode continuously fed by a wire feeder, such as wire feeder 10, through a torch, such as torch 11 (FIG. 4). The arc melts the wire electrode to form a weld puddle and an appropriate gas or gas mixture is delivered through tubing 12 and torch 11 and shields the weld area from atmospheric contamination.

Wire feeder 10 includes a housing, generally indicated at 13, which comprises a first housing member 14 having a side wall 14a, top wall 14b, bottom wall 14c and opposing end walls 14d and 14e (FIG. 4). A second housing member, generally indicated at 15, is mounted on first housing member 14 by bolts 16 with a gasket 17 therebetween. First and second housing members 14 and 15 define therebetween a gear compartment 18 which contains a suitable lubricant under normal operating conditions (FIG. 3).

Second housing member 15 is preferably a cast metal plate having sufficient strength and rigidity to serve as a mounting member for most of the operating units of the electrode wire feeder 10. Member 15 is formed with a first pair of openings 21 therethrough in the lower portion of the member 15, and a second pair of openings 22 therethrough above and in vertical alignment with the openings 21.

A first pair of shafts 23, 24 are mounted for rotation in openings 21 by bearings 25, but are otherwise stationary. Shafts 23, 24 have feed rolls 26, 27 mounted on the outer end portions thereof for rotation therewith. Pinion gears 28 are mounted on the inner end portions of shafts 23, 24 in driving relation thereto. A gasket 29 surrounds each shaft 23, 24 between the feed rolls 26, 27 and the housing member 15 and is compressed by a threaded portion of shaft 23 or 24 and a nut 30. Gasket 29 prevents leakage of the lubricant from compartment 18.

A second pair of shafts 31, 32 penetrate through openings 22 and are mounted for rotation about first axes in first and second eccentric mounting members 33, 34 by bearings 35. Eccentric mounting members 33, 34 are mounted for rotation about second axes in openings 22 by bearings 36. The second axes of rotation about which eccentric mounting members 33, 34 rotate are spaced from the first axes of rotation of shafts 31, 32 so that rotation of mounting members 33, 34 moves shafts 31, 32 upwardly or downwardly away from or toward the first shafts 23, 24.

Upper feed rolls 37, 38 are mounted on the outer end portions of shafts 31, 32 for rotation therewith. Feed rolls 37, 38 cooperate with lower feed rolls 26, 27 to form spaced apart pairs of feed rolls to feed an electrode wire W from a supply reel (not shown) to the torch 11. The feed rolls 26, 27, 37 and 38 have spaced apart circumferential grooves 26a, 26b, 27a, 27b, 37a, 37b, 38a and 38b therein for receipt and control of the wire W during feeding thereof. The innermost grooves 26b, 27b, 37b and 38b are the grooves that receive the wire W. The feed rolls can be removed and turned around if the innermost grooves become worn. Pinion gears 39 are mounted on the inner ends of shafts 31, 32 for rotation therewith and for meshing with pinion gears 28.

Plate member 15 has three aligned bosses 40, 41 and 42 formed thereon and which serve to mount three wire guides 43, 44 and 45 for guiding the electrode wire W to, through and away from the feed rolls 23, 37 and 24, 38 and through tube 12 to torch 11 (FIGS. 2 and 4).

Eccentric mounting members 33, 34 have operating levers 50, 51 mounted on the exterior surface thereof by respective bolts 52, 53. Lever 50 is mounted on the right side of eccentric mounting member 33 and lever 51 is mounted on the left side of eccentric mounting member 34. Thus, clockwise movement of lever 50 and counter-clockwise movement of lever 51 will rotate their respective eccentric mounting members 33, 34 from the operative position to the inoperative position and vice versa (FIGS. 1 and 2).

An externally threaded member 54 is pivotally mounted on the upper end of lever 51 and is pivotally movable into and out of a bifurcated upper end portion of lever 50. A slide member 55 is slidably mounted on member 54 and engageable with lever 50 when member 54 is within the bifurcated upper end of lever 50. A coil spring 56 is positioned within slide member 55 and engages an adjustment knob 57 which is threadably mounted on the outer end portion of member 54 for holding the levers 50 and 51 in the operative position and for biasing such levers toward that position. When it is desired to move the levers 50 and 51, the eccentric mounting members 33, 34 and the upper feed rolls 37, 38 from the operative to the inoperative position, the adjustment knob 57 is loosened and the member 54 is pivoted upwardly to release the levers 50 and 51. Then, the levers 50 and 51 are manually moved away from each other, rotating the eccentric mounting members 33, 34 and moving the upper feed rolls 37, 38 upwardly away from lower feed rolls 26, 27. The feed rolls 37, 38 are returned to the operative position by reversing these steps (FIGS. 1, 2 and 4).

The feed rolls 26, 27, 37 and 38 are driven by a suitable motor 60 having an output shaft 61 on which is mounted a drive gear 62. Motor 60 is mounted on housing member 14 by bolts 63 with a suitable sealing gasket (not shown) so that lubricant will not leak from compartment 18. Drive gear 62 meshes with pinion gears 28 on shafts 23, 24 of lower feed rolls 26, 27 (FIGS. 1 and 2).

Finally, housing 13 may include a protective cover 65 for the feed rolls 26, 27, 37 and 37 (FIG. 4). Cover 65 includes an opening 66 through which penetrate knobs 70, 71, 72 and 74 on the outer ends of shafts 23, 24, 31 and 32 of the feed rolls 26, 27, 37 and 38.

In operation, the cover 65 is removed and the upper feed rolls 37 and 38 are moved to the inoperative position by releasing the levers 50 and 51 and moving the same away from each other. The electrode wire W is fed manually from the source thereof (not shown) through guide 43, between feed rolls 26 and 37 in alignment with grooves 26a and 27a, through guide 44, between feed rolls 27 and 38 in alignment with grooves 27a and 38a and through guide 45 into tube 12. The levers 50 and 51 are then moved toward each other until the upper feed rolls 37 and 38 contact the lower feed rolls 26 and 27. The threaded member 54 is pivoted downwardly into the bifurcated end portion of lever 50 and the adjustment knob 57 is tightened.

Motor 60 is then energized to drive the feed rolls 26, 27, 37 and 38 until wire W exits the torch 11. The cover 65 is then replaced and the wire feeder 10 is ready for welding operations with the drive gearing properly lubricated and protected.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An electrode wire feeder for an arc welding system comprising a housing having first and second spaced apart side walls and top, bottom and end walls defining an enclosed, sealable compartment, adapted to contain a lubricant therein, at least one pair of wire feed rolls, including a bottom roll and a top roll positioned exteriorly of said compartment, one of said rolls being mounted on one end portion of a rotatable first shaft for rotation therewith, said first shaft being mounted for rotation on said first side wall and penetrating therethrough so that the end portion thereof on which said feed roll is mounted is exteriorly of said compartment and the other end portion thereof is within said compartment, the other of said pair of feed rolls being mounted on an end portion of a second rotatable shaft for rotation therewith, said second shaft also penetrating through said first side wall so that the end portion thereof on which said feed roll is mounted is exteriorly of said compartment and the other end portion thereof is within said compartment, means for mounting said second shaft on said first side wall for movement between an operative position in which said feed rolls are in an operative feeding relationship to each other and an inoperative position in which said feed rolls are spaced-apart and are in an inoperative relationship, first and second pinion gears drivingly mounted on the end portions of said first and second shafts in said compartment, said second pinion gear being movable with said second shaft between the operative position in which said second pinion gear is in meshing relation with said first pinion gear and the inoperative position in which said second pinion gear is out of meshing relation with said first pinion gear, and drive means for driving said pinion gears to rotate said feed rolls and feed the wire electrode.

2. An electrode wire feeder according to claim 1 wherein two pairs of feed rolls are provided in spaced apart, aligned relationship exteriorly of said housing.

3. An electrode wire feeder according to claim 1 wherein said means for mounting said second shaft for movement between operative and inoperative positions comprises a cylindrical mounting member sealingly mounted for rotation about a predetermined axis of rotation in an opening through said first side wall, said mounting member having an opening therethrough through which said second shaft penetrates and in which said second shaft is mounted for rotation about an axis eccentric to the axis of rotation of said mounting member so that rotation of said mounting member will move said second shaft and said upper feed roll between the operative and inoperative positions.

4. An electrode wire feeder according to claim 3, including an operating lever mounted on said mounting member exteriorly of said housing for manual rotation of said mounting member.

5. An electrode wire feeder according to claim 4, including means connected to said operating lever for biasing said upper feed roll toward said lower feed roll when said upper feed roll is in said operative position.

6. An electrode wire feeder according to claim 5 wherein said biasing means is adjustable so that the biasing force applied to said upper feed roll may be varied.

7. A electrode wire feeder for an arc welding system comprising a housing defining an enclosed compartment for containing a lubricant therein, first and second pair of feed rolls mounted for rotation exteriorly of said housing by first and second pairs of shafts having one end portion thereof exteriorly of said housing, on which said feed rolls are mounted, and another end another end portion thereof in said compartment within said housing, first and second pair of pinion gears drivingly mounted on said end portions of said shafts within said compartment, said pinion gears of each of said pairs normally being in meshing relation so that said feed rolls are positively driven, means for mounting one of the shafts of each pair of shafts for movement toward and away from the other shaft of each pair of shafts of move said feed rolls of each of said pair of feed rolls between operative and inoperative positions and said pinion gears out of meshing relation, and means for driving said pinion gears to rotate said feed rolls for feeding the electrode wire.

8. An electrode wire feeder according to claim 7 wherein said mounting means for one of the shafts of each pair of shafts comprises a pair of eccentric mounting members mounted in one side of said housing for rotation about centrally located axis and mounting said shafts for rotation about axis eccentrically located relative to the axis of rotation of said mounting members.

9. An electrode wire feeder according to claim 8, including an operating lever attached to each of said mounting members for manual rotation thereof.

10. An electrode wire feeder according to claim 9, including means connected to said operating levers for biasing said levers toward the operative position of said feed rolls.

11. An electrode wire feeder according to claim 10 wherein one of said operating levers rotates said mounting member attached thereto counter-clockwise to move said feed roll carried thereby to the inoperative position and clockwise to move said feed roll to the operative position and wherein the other of said operating lever rotates said mounting member attached thereto clockwise to move said feed roll carried thereby to the inoperative position and counterclockwise to move said feed roll to the operative position.

12. An electrode wire feeder according to claim 11 wherein said biasing means comprises an adjustment member pivotally connected to one of said operating levers, spring carried by said adjustment member and engageable with the other of said operating levers to bias said operating levers toward each other, and a hand knob on said adjustment member on the opposite side of said spring from the other of said operating levers and movable along said adjustment member to vary the biasing force applied to said operating levers.

\* \* \* \* \*